United States Patent
Mittal et al.

(10) Patent No.: US 11,375,050 B1
(45) Date of Patent: Jun. 28, 2022

(54) MULTIPLE PROTOCOL LAYER CONVERSION

(71) Applicant: XILINX, INC., San Jose, CA (US)

(72) Inventors: Millind Mittal, Saratoga, CA (US); Jaideep Dastidar, San Jose, CA (US); Kiran Puranik, Fremont, CA (US)

(73) Assignee: XILINX, INC., San Jose, CA (US)

( * ) Notice: Subject to any disclaimer, the term of this patent is extended or adjusted under 35 U.S.C. 154(b) by 125 days.

(21) Appl. No.: 17/019,039

(22) Filed: Sep. 11, 2020

(51) Int. Cl.
*H04L 69/18* (2022.01)

(52) U.S. Cl.
CPC .................. *H04L 69/18* (2013.01)

(58) Field of Classification Search
CPC ...................................... H04L 69/18
See application file for complete search history.

(56) References Cited

U.S. PATENT DOCUMENTS

| 5,778,189 A * | 7/1998 | Kimura | G06F 13/387 709/236 |
| 7,949,794 B2 * | 5/2011 | Ajanovic | G06F 13/4045 710/305 |
| 8,782,321 B2 * | 7/2014 | Harriman | G06F 13/4295 710/316 |
| 2019/0004990 A1 * | 1/2019 | Van Doren | G06F 13/385 |
| 2019/0042292 A1 | 2/2019 | Palermo et al. | |

* cited by examiner

*Primary Examiner* — James E Springer
*Assistant Examiner* — Patrick F Ngankam
(74) *Attorney, Agent, or Firm* — Patterson + Sheridan, LLP (57) ABSTRACT

Embodiments herein describe a layer converter that includes a proxy legacy interface that permits the layers for a legacy interconnect protocol to be recycled without any modifications, thus achieving legacy functionality alongside the new protocols' layer implementation. Put differently, the layer converter permits the layers of the legacy interconnect protocol to be reused to permit data to be transmitted on a link shared with data transmitted using a new interconnect protocol.

20 Claims, 5 Drawing Sheets

MULTIPLE PROTOCOL LAYER CONVERSION

TECHNICAL FIELD

Examples of the present disclosure generally relate to using a layer converter when combining a new interconnect protocol with a legacy interconnect protocol that share a common link.

BACKGROUND

Modern interconnect protocols such as PCIe typically follow a layered approach in a communication stack to separate the distinct functional aspects of the protocol, namely the Electrical Physical Layer (PHY), Logical PHY, Data Link Layer (DLL) and Transaction Layer (TL). The Logical PHY is the upper layer relative to the Electrical PHY, and the DLL is the upper layer relative to the Logical PHY and the TL is the upper layer relative to the DLL.

The layered approach allows these protocols to define new protocol specifications for one layer independent of the others—for example, the Electrical PHY Layer specification in PCIe between Gen4 and Gen5 increased its data rate from 16 GT/s to 32 GT/s leaving the option of having the Logical PHY Layer, DLL and TL remain the same as previous generations. The complexities of the technologies are such that improvements in the upper layers' new protocol specifications rely on digital and process technology improvements, such as the TL or DLL, and as a result move at a faster pace than improvements in the PHY layers' new protocol specifications, which primarily relies on analog technology improvements.

This rapid advancement in the upper layers is apparent in several recent new interconnect protocols. For example, the Compute Express Link (CXL) specification defined a new Logical PHY Layer, CXL DLL and CXL TL specification, while using the PCIe Gen5 Electrical PHY Layer specification for the external transport interface for the new CXL protocol as well as the legacy PCIe DLL and PCIe TL protocol. Second, PCIe Gen5 specification defined a PMUX option which allows new/custom Logical PHY Layer. DLL, and TL specifications while using the PCIe Electrical PHY Layer specification for all the PMUX protocols. The PMUX option in the specification also maintains a branch to the legacy PCIe DLL and PCIe TL protocol. Third, the Cache Coherent Interconnect for Accelerators (CCIX) specification defined a new TL, while using the PCIe Gen4 and Gen5 PHY Layer specifications as the external transport interface, respectively, and using the PCIe Electrical PHY Layer specification and PCIe DLL specification for both the CCIX and PCIe TL protocols.

Even though new protocol specifications leveraged existing layers of a legacy protocol, previous implementation techniques complied with these new protocol specifications (e.g., CXL, PCIe Gen5 PMUX, or CCIX) by designing implementations with the new protocol specifications' functions, as well as re-designing the remaining layers of the legacy protocols. For example, the CXL implementation re-uses the PCIe Gen5 Electrical PHY Layer design for the external transport interface but designs a new Logical PHY Layer, CXL DLL, and CXL TL and re-designs the legacy PCIe DLL. The PCIe Gen5 PMUX implementation re-uses the PCIe Electrical PHY Layer design for the external transport interface but designs a new/custom Logical PHY Layer, DLL, and TL and re-designs the legacy PCIe DLL to interface with the new Logical PHY Layer. The CCIX implementation re-uses the PCIe PHY but designs a new CCIX TL and re-designs the legacy PCIe DLL to recognize and separate traffic to the corresponding CCIX TL and PCIe TL. These new interconnect protocols continue to maintain the progression of layers, in that the implementations incorporating a new protocol specification maintain that a specified upper layer component must receive traffic from the specified lower layer component, in the same sequence and order as described in the specification.

SUMMARY

One embodiment described herein is a computing system that includes a port configured to couple to a link to an external computing system, a first upper layer coupled to the port and configured to separate data received from the external computing system into first data transmitted according to the first interconnect protocol and second data transmitted according to the second interconnect protocol, a layer converter that includes a first interface configured to receive the first data from the first upper layer and up convert the first data according to the second interconnect protocol and a second interface configured to receive the first data from the first interface and down convert the first data to be compatible with the first interconnect protocol, and a second upper layer coupled to the second interface where the second upper layer is defined by the first interconnect protocol.

Another embodiment described herein is an integrated circuit that includes an electrical physical layer (PHY) configured to transmit and receive data using a link with an external computing system, a first upper layer coupled to the electrical PHY and configured to separate data received from the external computing system into first data transmitted according to a first interconnect protocol and second data transmitted according to a second interconnect protocol, a layer converter that includes a first interface configured to receive the first data from the first upper layer and up convert the first data and a second interface configured to receive the first data from the first interface and down convert the first data, and a second upper layer coupled to the second interface, wherein the first and second upper layers are a same layer in a communication stack.

Another embodiment described herein is a method that includes receiving data via a link from an external computing system using an electrical PHY, separating the received data into first data transmitted according to the first interconnect protocol and second data transmitted according to the second interconnect protocol, up converting the first data according to the second interconnect protocol, down converting the up converted data to be compatible with the first interconnect protocol, and processing the down converted data at an upper layer compatible with the first interconnect protocol.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The disadvantages of the implementations discuss above is that although specifications were created in a layered manner such that the legacy component specifications were left unmodified, prior techniques still require legacy implementations to undergo modifications to interface with the newly defined layer(s). That is, designs for a legacy interconnect protocol (e.g., PCI Gen 5 or earlier) are unable to be recycled in the new interconnect protocol (e.g., CXL, PCIe Gen5 PMUX, or CCIX) even though the new protocol specification retained some or all of the same layers of the legacy protocol. Unlike prior techniques, the embodiments herein do not require legacy implementations to undergo modifications to interface with the newly defined layer(s) defined by (i.e., compliant with) the new interconnect protocol. Instead, embodiments herein describe a layer converter that includes a proxy legacy interface that permits the layers for the legacy protocol to be recycled without any modifications, thus achieving legacy functionality alongside the new protocols' layer implementation. Put differently, the layer converter permits the layers of the legacy interconnect protocol to be reused to permit data to be transmitted on a link shared with data transmitted using the new interconnect protocol.

Depending on the protocol, a common link may be shared either statically or dynamically. That is, the traffic for the new protocol may either statically replace the legacy protocol for all communication over the common link in a particular mode of operation, or the new and legacy protocols share communication with their protocol peers using the common physical link, or a common physical link and certain common layers above it. The layer converter permits the layers of the legacy interconnect protocol to be reused to permit data to be transmitted on the common link, either physically shared in the case of statically shared common link, or logically shared in the case of a dynamically shared common link, with data transmitted using the new interconnect protocol. As discussed below, "sharing" the common link can either be sharing in time, or sharing in space—e.g. implementations that share the physical link.

Figure 1:
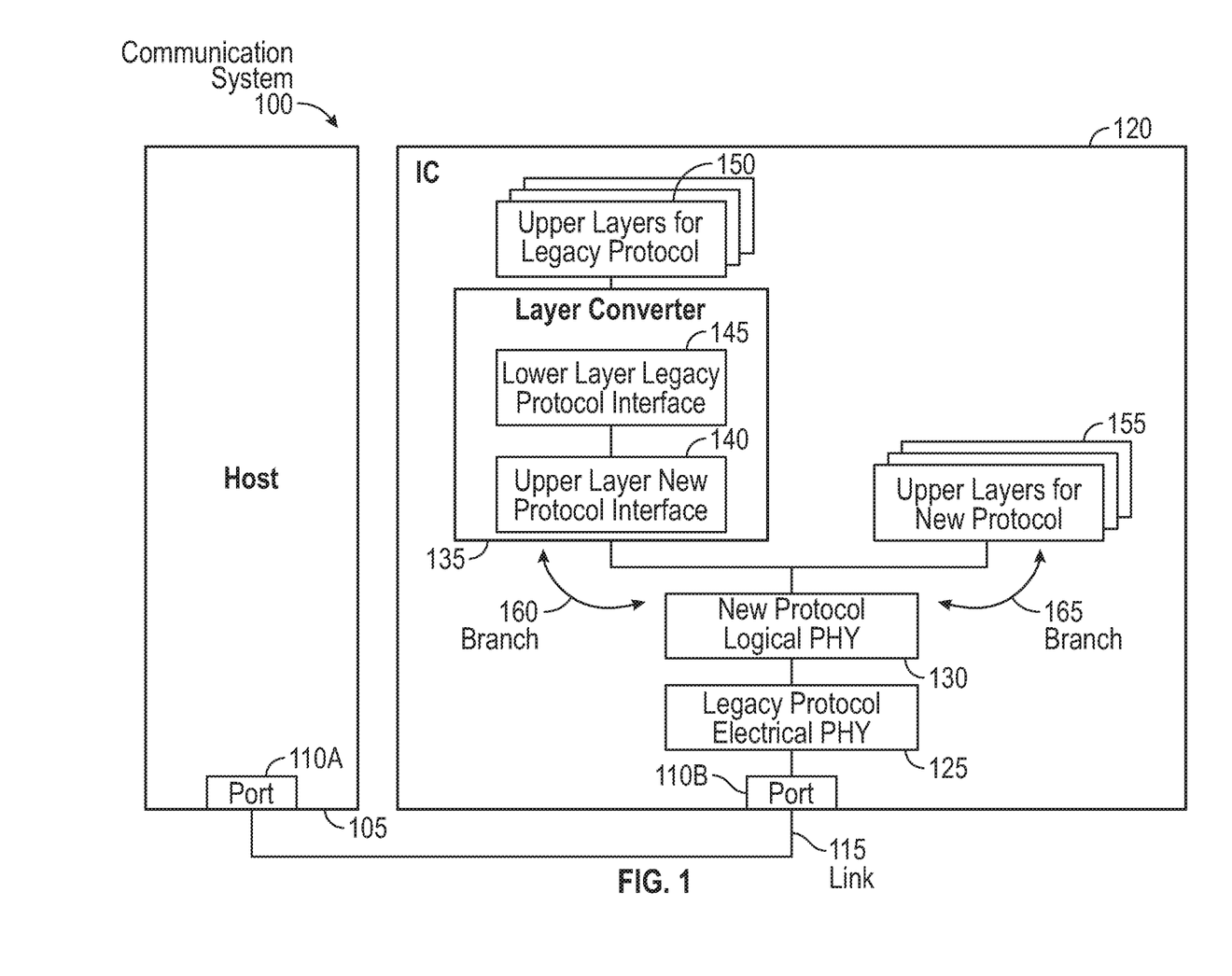
FIG. 1 illustrates a communication system that includes a layer converter for supporting a legacy interconnect protocol, according to an example.

FIG. 1 illustrates a communication system 100 that includes a layer converter 135 for supporting a legacy interconnect protocol, according to an example. The communication system 100 includes a host 105 that is communicatively coupled to an integrated circuit (IC) 120 via a link 115. As shown, the link 115 couples a port 110A on the host 105 to a corresponding port 110B on the IC 120. The link 115 can include any number of wires or lanes for transmitted data (e.g., differential signals) between the host 105 and the IC 120. In one embodiment, data is transmitted across the link 115 using at least two different interconnect protocols such as an older, legacy version or generation of PCIe and a new newer version or generation of PCIe, or CXL, or CCIX, or another protocol (e.g., GenZ, QuickPath Interconnect/Ultra Path Interconnect (QPI/UPI), Infinity Fabric, NVLink™, and Open Coherent Accelerator Processor Interface (OpenCAPI)). As such, the link 115 is referred to herein as shared or common link since it can be used to transmit data formatted using two different interconnect protocols.

The host 105 can be any computing system such as a server, desktop, laptop, etc. which has any number of processors or memory (not shown). In one embodiment, the host 105 executes one or more software applications that transmit tasks to be completed by the processing elements on the IC 120. For example, the IC 120 may be a peripheral device (or part of a peripheral device) that serves as an accelerator for the host 105 to perform task such as graphics processing, compression/decompression, encryption, machine learning/artificial intelligence functions, near memory computation and the like. Further, while the embodiments below discuss implementing a stack of layers (and the layer converter 135) on the IC 120, this stack of layers can also be implemented in the host 105.

The IC 120 may be a field programmable gate array, a system on a chip (SoC), graphics processing unit (GPU), application specific integrated circuit (ASIC), and the like. In general, the IC 120 can be part of any computing device or computing system that uses a shared link 115 that supports multiple interconnect protocols to communicate with a separate computing device or system—e.g., the host 105.

The IC 120 uses a plurality of layers that generally change in complexity when moving away from the port 110B. For example, the IC 120 may have a PHY layer for receiving the analog signals from the port 110B, a DLL, and a TL. The TL can then be coupled to a processor or processing element in the IC 120 which processes the data and transmits resulting back to the host 105. In FIG. 1, the port 110B is coupled to a legacy protocol electrical PHY 125. In this example, the PHY layer is divided into two sub-portions: the electrical PHY 125 and a logical PHY. As described below, the IC 120 actually has two logical PHYs: one for the legacy interconnect protocol (e.g., a previous version/generation of PCIe) and one for a new interconnect protocol (e.g., a newer version of PCIe or a cache coherency interconnect protocol such as CXL, CCIX, QPI, NVlink, etc.). The electrical PHY 125 is the same design that is defined by the legacy interconnect protocol. That is, the electrical PHY 125 can be reused from the specification of the legacy interconnect protocol without having to make any modifications to accommodate the data transmitted using the new interconnect protocol. In general, the electrical PHY 125 receives analog signals from the ports 110B (e.g., differential signals) and uses serializer deserializers (SERDES) to generate digital signals for an upper layer—i.e., a logical PHY 130 for the new interconnect protocol.

The logical PHY 130 for the new interconnect protocol is designed according to the specification for the new interconnect protocol and is designed to accommodate data transmitted by both protocols. However, unlike the electrical PHY 125 which does not know that it is processing signals/data transmitted according to two different interconnect protocols, the new protocol logical PHY 130 can discriminate between data transmitted using the legacy interconnect protocol and data transmitted using the new interconnect protocol. As shown in FIG. 1, the logical PHY 130 can perform a routing or muxing operation such that data transmitted using the new legacy interconnect protocol is routed on branch 165 while data transmitted using the legacy interconnect protocol is transmitted on branch 160. The function of the logical PHY 130 varies according to the new interconnect protocol being implemented and is typically defined by a specification associated with that new interconnect protocol, and thus, is not described in detail herein.

The branch 165 includes upper layers 155 for the new interconnect protocol. For example, these can include such layers as DLL or TL that are defined by the specification for the new interconnect protocol. Again, the functions and details of these layers varies depending on the new interconnect protocol, and thus, the details of the upper layers 155 are not provided herein. The embodiments herein can be used when any legacy interconnect protocol implementation is being combined to support backwards compatibility with a legacy interconnect protocol, even if the new interconnect protocol is developed in the future.

The branch 160 includes the layer converter 135 which, in general, enables the various layers of the legacy interconnect protocol to be reused (e.g., recycled) without having to be modified to accommodate the new interconnect protocol. For example, if the specification of the legacy interconnect protocol defines an electrical PHY, logical PHY, DLL, and TL, the designs for these layers can be reused—without modification—in the IC 120 along with the various layers for the new interconnect protocol and still share the same link 115. As mentioned above in the background section, previous implementations of PCI PMUX, CXL, and CCIX require one (or several) of the layers of the legacy version of PCIe to be modified to accommodate these new interconnect protocols. Not only does a system designer have to design these modified layer(s) for the legacy interconnect protocol, these modified layers have to be tested and verified to ensure the function correctly. Thus, substantial costs and resources have to be dedicated to ensuring the modified layers of the legacy interconnect protocol work correctly. However, the embodiments herein avoid these added costs by permitting the original or unmodified designs for the layers of the legacy interconnect protocol to be reused.

To do so, the layer converter 135 includes an upper layer new protocol interface 140 that is designed according to the specification of the new interconnect protocol to interface with the logical PHY 130 and a lower layer legacy protocol interface 145 designed to interface with upper layers 150 for the legacy interconnect protocol. The upper layer new protocol interface 140 (i.e., an upper layer interface for the new protocol) is designed to send data to and receive data from the new protocol logical PHY 130, and thus, uses the specification for the new interconnect protocol. In one embodiment, the upper layer protocol interface 140 func- tions like the DLL from the new protocol logical PHY 130's perspective. Put differently, the upper layer protocol interface 140 up converts the data sent to or received from the legacy protocol's Logical PHY 150, to appear as if the new protocol's DLL, compliant with the new protocol's interface, is sending data to and receiving data from the new protocol's Logical PHY 130.

In order for the data to be transmitted to the upper layers 150 of the legacy interconnect protocol, the lower layer legacy protocol interface 145 (i.e., a lower layer interface for the legacy protocol) performs a down conversion operation so the data can be transmitted according to a standard interface defined by the legacy interconnect protocol. That is, while the upper layer protocol interface 140 up converts data received from the logical PHY (e.g., from the logical PHY to the DLL), the lower layer protocol interface 145 down converts the data received from, or sent to, the interface 140 (e.g., from a new protocol's DLL interface back to the legacy protocol's logical PHY interface). Thus, while in previous interconnect protocols, the received data progress constantly from lower layers to upper layers (e.g., from PHY to DLL to TL), in FIG. 1, received data on the branch 160 is first up converted to DLL before being down converted back to a logical PHY to the upper layers 150. Up converting and then down converting the received data, however, enables the layers from the legacy interconnect protocol to be reused without modification. That is, to the perspective of the data transmitted by the legacy interconnect protocol, it appears as the data is transmitted between the port 110B and the upper layers 150 for the legacy interconnect protocol using only layers designed according to the specification of the legacy interconnect protocol. That is, the layer converter 135 is transparent and the branch 160 functions as it would if the upper layers 150 were directly connected to the electrical PHY 125 (i.e., if the layer converter 135, the logical PHY 130, and the upper layers 155 for the new interconnect protocol were omitted).

The upper layers 150 can include a logical PHY, DLL, and TL designed according to the specification of the legacy interconnect protocol. However, the legacy interconnect protocol may have more or fewer layers than these. Further, while FIG. 1 illustrates placing the layer converter 135 after the electrical PHY 125, when combining other interface protocols, it may be necessary or optimal to place the layer converter 135 between different layers—e.g., between the logical PHY and DLL layers of the legacy interconnect protocol. In that case, the layer converter 135 would up convert the data to a TL layer for the new interconnect protocol but then down convert the data so it can be transmitted to a DLL layer in the legacy interconnect protocol.

Further, as discussed in more detail below in FIG. 4, the layer converter 135 can span one layer of the legacy interconnect protocol (e.g., between the logical PHY of the new protocol and the logical PHY of the legacy protocol) or can span across multiple layers (e.g., between the logical PHY of the new protocol and the TL of the legacy protocol).

Figure 2:
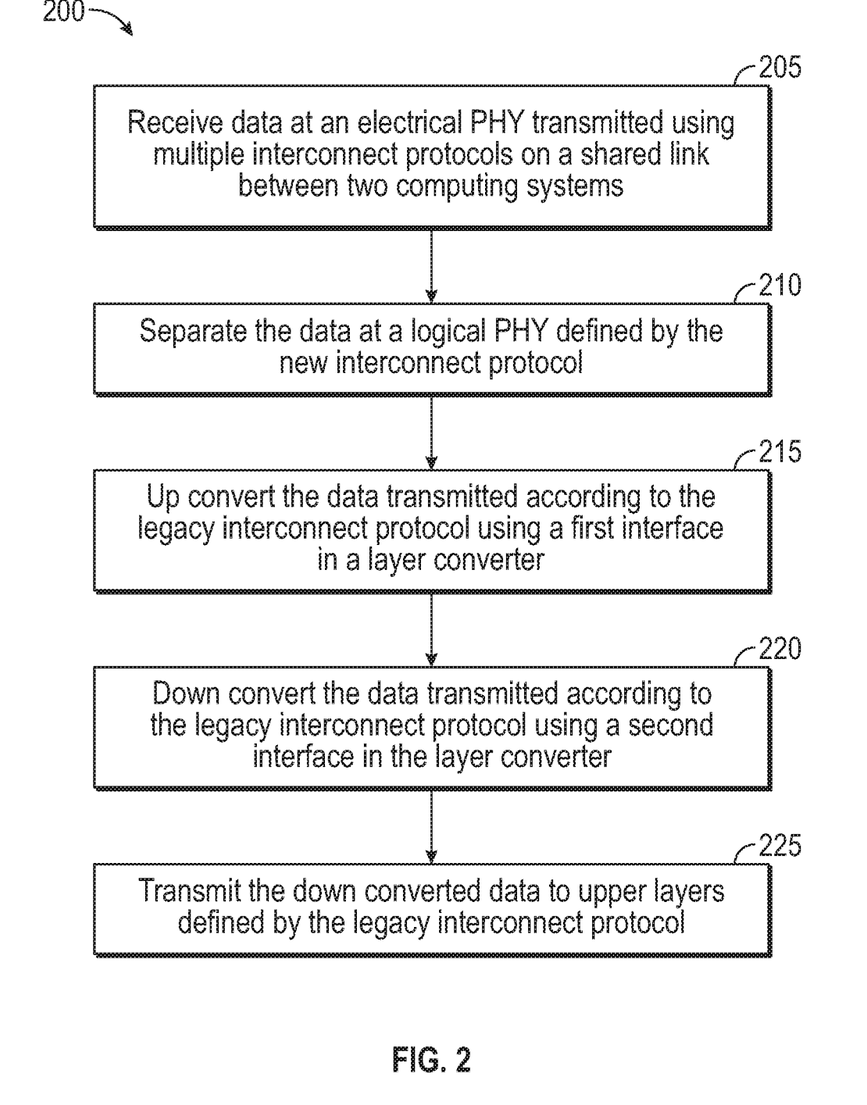
FIG. 2 is a flowchart for receiving data on a shared link supporting two different interconnect protocols, according to an example.

FIG. 2 is a flowchart of a method 200 for receiving data on a shared link supporting two different interconnect protocols, according to an example. At block 205, an integrated circuit (or more generically, a first computing system), receives data at an electrical PHY transmitted using multiple protocols on a shared link between the integrated circuit and a second computing system (e.g., a host). In one embodiment, the shared link is a PCIe link that supports both a PCI interconnect protocol (e.g., a legacy interconnect protocol) and a coherency interconnect protocol or a newer version of the PCIe interconnect protocol (e.g., a new interconnect protocol). However, the embodiments herein are not limited to these protocols, but can be extended to any communication system that supports data being transmitted using at least two different interconnect protocols using a shared link.

In one embodiment, the electrical PHY is defined by the legacy interconnect protocol rather than the new interconnect protocol. For example, the electrical PHY may be the same IP block that was used in a communication system that supported only the legacy interconnect protocol. Thus, the electrical PHY does not need to be redesigned or replaced in order to support both the legacy and new interconnect protocols.

At block 210, the integrated circuit (or first computing system) separates the data at a logical PHY defined by the new interconnect protocol. That is, the logical PHY performs a de-multiplexing or splitting function where data transmitted according to the legacy interconnect protocol is transmitted along a first data path (e.g., the branch 160 in FIG. 1) while data transmitted according to the new interconnect protocol is transmitted along a second data path (e.g., the branch 165 in FIG. 1). The logical PHY can use various types of information in the data to identify the interconnect protocol corresponding to the data and then select the corresponding data path.

Further, while the method 200 describes performing this de-multiplexing function in a logical PHY, the embodiments herein are not limited to performing this function in that layer. In another embodiment, a DLL, which is defined by the new interconnect protocol, may be used to perform the de-multiplexing function to determine whether the data should be transmitted on the first data path corresponding to the legacy interconnect protocol or the second data path corresponding to the new interconnect protocol.

At block 215, the layer converter in the integrated circuit, which is disposed in the first data path, up converts the data transmitted according to the legacy interconnect protocol using a first interface. In one embodiment, the first interface is compatible with the new interconnect protocol so that it can receive data from the logical PHY, which is defined by the new interconnect protocol. Stated differently, the first interface permits the layer converter to communicate with a layer defined by the new interconnect protocol. In this embodiment, the first interface has some or all of the functions performed by a DLL defined by the new interconnect protocol.

At block 220, the layer converter down converts the data transmitted according to the legacy interconnect protocol using a second interface. The second interface is compatible with the legacy interconnect protocol so that it can transmit (and receive) data to a layer defined by the legacy interconnect protocol—e.g., a logical PHY defined by a legacy PCIe standard. Stated differently, the second interface permits the layer converter to communicate with a layer defined by the legacy interconnect protocol.

In one embodiment, the second interface permits the layer converter to communicate with the logical PHY using a standard interface. In the case of PCIe, the second interface can support PHY Interface for the PCI Express (PIPE) standard interface. PIPE is a standard interface defined between PHY sub-layers (e.g., the electrical and logical PHYs). By supporting the standard interface, the second interface permits the layer converter to communicate with a logical PHY defined by the legacy interconnect protocol. That is, the logical PHY can be reused without any modifications since the second interface in the layer converter supports a standard interface (e.g., PIPE).

At block 225, the layer converter transmits the down converted data to upper layers defined by the legacy interconnect. In one embodiment, the second interface in the layer converter transmits the data to the logical PHY, DLL, TL, etc. that are defined by the legacy interconnect protocol. However, as discussed above, the layer converter may be disposed between different layers in the legacy interconnect protocol than between the electrical and logical PHY. For example, the layer converter may be disposed between the logical PHY and the DLL of the legacy interconnect protocol.

Further, while method 200 specifically describes in blocks 215-225 the first data path for the data transmitted using the legacy interconnect protocol, the method 200 also includes transmitting the data corresponding to the new interconnect protocol using the second data path. However, the details of this second data path are not described herein since they will vary according to the particular interconnect protocol. Nonetheless, in one embodiment the second data path includes layers such as a DLL and TL which are defined by the new interconnect protocol.

Figure 3:
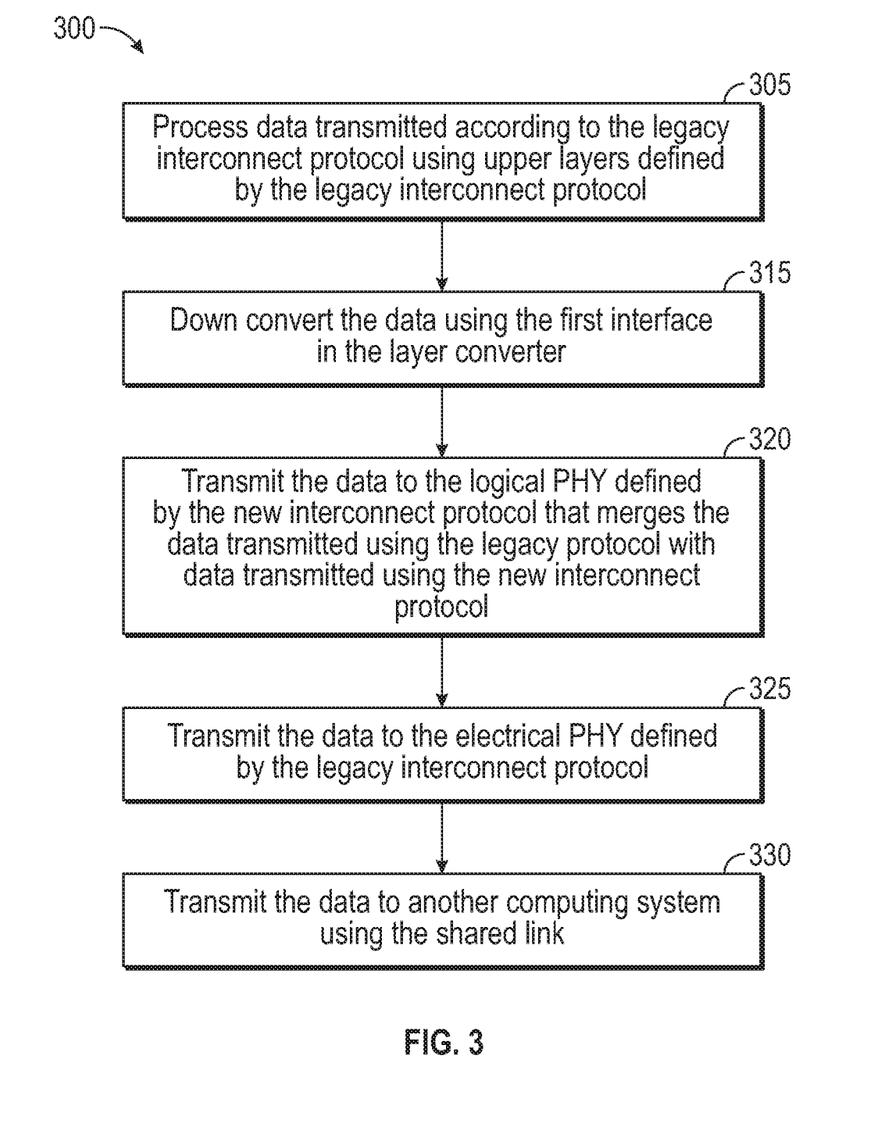
FIG. 3 is a flowchart for transmitting data on a shared link supporting two different interconnect protocols, according to an example.

FIG. 3 is a flowchart of a method 300 for transmitting data on a shared link supporting two different interconnect protocols, according to an example. That is, while FIG. 2 is a method of receiving data, FIG. 3 describes a method 300 for transmitting data to an external computing system. Further, the method 300 focuses on the first data path used by data corresponding to the legacy interconnect protocol. The second data path used by the data corresponding to the new interconnect protocol, while included in the method 300, is not described in detail in the blocks below.

At block 305, the integrated circuit processes data transmitted according to the legacy interconnect protocol using upper layers defined by the legacy interconnect protocol. These upper layers can include the TL, DLL, or logical PHY. The layers can be defined by the legacy interconnect protocol so that they do not need to be modified when connected to a link shared by data corresponding to a new interconnect protocol.

At block 310, the layer converter up converts the data using the second interface. That is, unlike in method 200 where the second interface down converts the data to interface with the logical PHY in the upper layers, in the method 300 the second interface up converts the data so it is compatible with the first interface of the layer converter (which functions like a DLL defined by the new interconnect protocol).

Like in method 200, the communication interface between the upper layer (e.g., the logical PHY) and the second interface may be a standard interface such as PIPE.

At block 320, the layer converter transmits the data to the logical PHY defined by the new interconnect protocol that merges the data transmitted using the legacy protocol with data transmitted using the new interconnect protocol. For example, the logical PHY layer can receive data from the first and second data paths and forward this data to the electrical PHY using a standard interface compatible with the legacy interconnect protocol.

At block 325, the logical PHY transmits the data, which includes data transmitted using both the legacy and new interconnect protocol, to the electrical PHY. Again, this electrical PHY can be designed according to the legacy interconnect protocol while the logical PHY is designed according to the new interconnect protocol.

At block 330, the electrical PHY transmits the data to another compute system using the shared link. At this layer, it does not matter whether the data was transmitted using the legacy interconnect protocol or the new interconnect protocol. That is, the electrical PHY can process and transmit data regardless whether it compatible with the legacy interconnect protocol or the new interconnect protocol. In this manner, data transmitted according to the two separate interconnect protocols can be transmitted using the shared link using one or more layers that are designed according to the legacy interconnect protocol, without those layers having to be modified.

Figure 4:
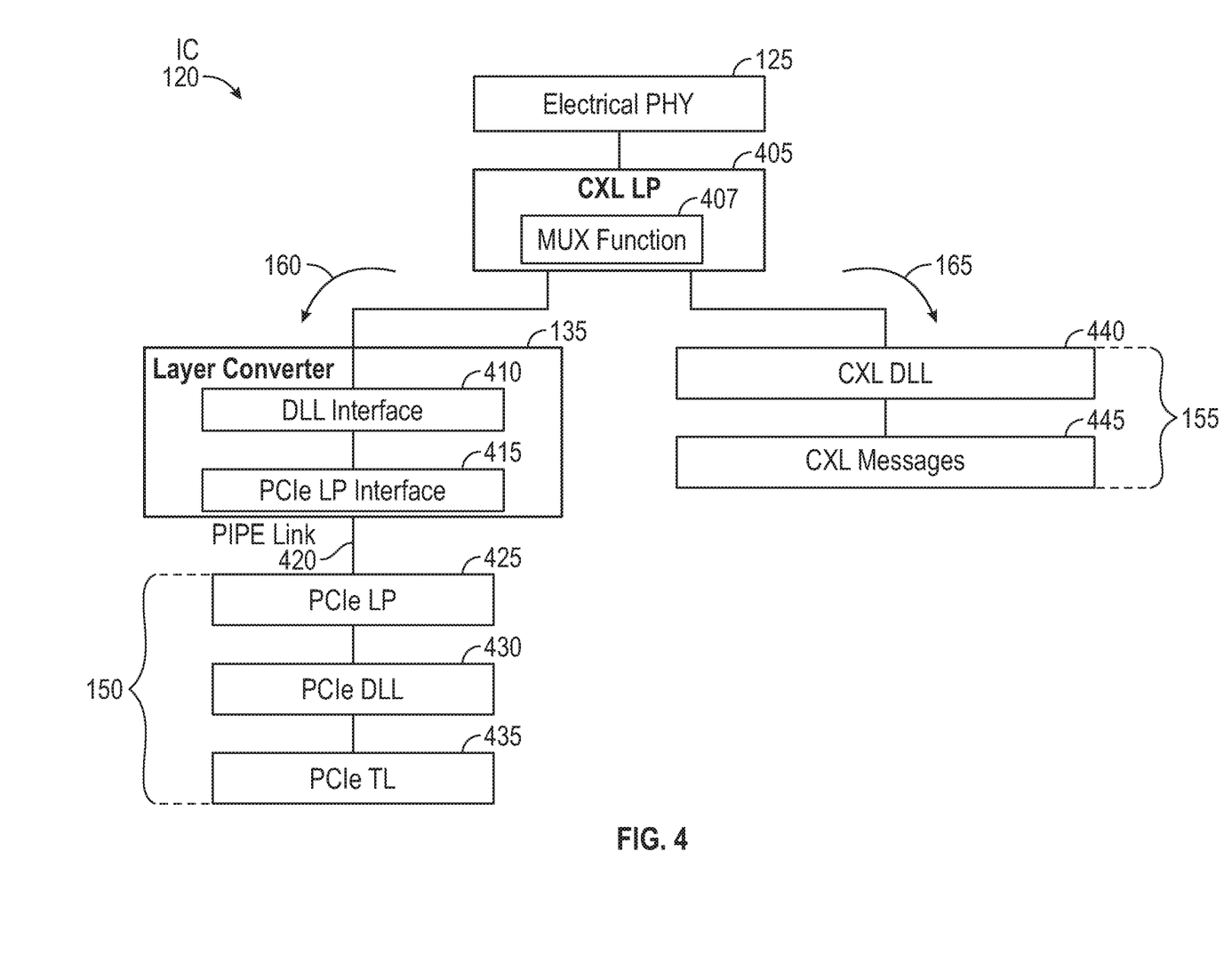
FIG. 4 illustrates a communication system that supports CXL and PCIe interconnect protocols using a layer converter, according to an example.

FIG. 4 illustrates a communication system that supports CXL and PCIe interconnect protocols using a layer converter, according to an example. FIG. 4 illustrates one embodiment of permitting different interconnect protocols (e.g., CXL and PCIe) to share a shared link. As mentioned above, the embodiments herein are not limited to CXL or PCIe.

In this embodiment, the IC 120 includes the electrical PHY 125 that is coupled at a north end to the shared link (not shown) which is coupled to another computing system. The electrical PHY 125 can be designed according to the legacy or first interconnect protocol (e.g., PCIe). The south end of the electrical PHY 125 is coupled to a CXL logical PHY (LP) 405 which has a multiplexing and de-multiplexing function. i.e., mux function 407. The CXL logical PHY 405 is defined according to the CXL specification (e.g., a new interconnect protocol). When receiving data from the external computing system, the CXL logical PHY 405 is tasked with using the mux function 407 to separate data transmitted according to PCIe and data transmitted according to CXL. Specifically, data transmitted according to PCIe is transmitted along branch 160 while data transmitted according to CXL is transmitted on branch 165. Conversely, when transmitting data to the external computing system, the CXL logical PHY 405 merges the data received from the branches 160 and 165.

The branch 165 includes a CXL DLL 440 and a CXL messages layer 445 which are defined by the CXL specification. These layers are designed to process data transmitted according to CXL (e.g., a cache coherency protocol). That is, the CXL DLL 440 and CXL messages layer 445 are one example implementation of the upper layers 155 shown in FIG. 1.

The branch 160, on the other hand, includes the layer converter 135, a PCIe LP 425, PCIe DLL 430, and PCIe TL 435. In this example, the layer converter 135 has a DLL interface 410, which is one example implementation of the upper layer protocol interface 140 in FIG. 1, and a PCIe LP interface 415, which is one example implementation of the lower layer protocol interface 145. The DLL interface 410 performs some or all of the functions of the CXL DLL 440 as described in the CXL specification. As such, the DLL interface 410 is compatible with the CXL logical PHY 405.

The PCIe LP interface 415, however, is compatible with the PCIe LP 425, and as such, uses a PIPE link 420 to communicate with the PCIe LP 425. As described in FIGS. 2 and 3, when receiving data, the DLL interface 410 up converts the data before the PCIe LP interface 415 down converts the data so that the PIPE standard interface can be used to transmit data to the PCIe LP 425. When transmitting data to the external computing source, the PCIe LP interface 415 up converts the data received from the PCIe LP 425 so that the data is compatible with the CXL logical PHY 405. The functional operation of the layer converter 135, the PCIe LP 425, and the PCIe DLL 425 is that same as if the CXL Logical PHY Layer 405 was interfacing directly with a PCIe DLL that was redesigned to be compatible with the new CXL Logical PHY 405, when in reality, the PCIe DLL 430 continues to be the legacy PCIe design.

Notably, the layer attached to the north end of the layer converter 135 (i.e., the CXL LP 405) and the layer attached to the south end of the layer converter 135 (i.e., the PCIe LP 425) are the same layer in a communication stack (i.e., the hierarchy of layers defined by a interconnect protocol that permit actors in the IC 120 to communicate with an external computing system via the link) but are defined by two different interconnect protocols. That is, the CXL LP 405 and the PCIe LP 425 are both logical PHYs but one is compatible with the CXL protocol while the other is compatible with the PCIe protocol.

Instead of a typical interconnect protocol where received data linearly progresses from lower layers (e.g., a PHY layer) to upper layers (e.g., TL), in this and previous embodiments, the received data is first processed by a higher level (e.g., the DLL interface 410) before being down converted to a lower level (e.g., the logical PHY). Similarly, when transmitting data, the data typically linearly progresses from higher layers to lower layers, but in the embodiments herein, the data is up converted by the PCIe LP interface 415 from a logical PHY to the DLL interface 410. Nonetheless, departing from the typical linear progression from lower to upper layers or from upper to lower layers provides the advantage of re-using the same IP (e.g., the same layers) defined by the legacy interconnect protocol.

The PCIe LP 425, PCIe DLL 430, and the PCIe TL 435 are an example implementation of the upper layers 150 for the legacy interconnect protocol illustrated in FIG. 1. These layers, along with the electrical PHY 125, can be re-used from designs where a link was not shared by multiple interconnect protocols—e.g., when PCIe is the only interconnect protocol being used. Thus, when designing the IC 120, these layers can be re-used without modification which can save in design and debugging time (since the PCIe layers may have previously been verified).

Further, the layer converter 135 can span multiple layers of the legacy interconnect protocol rather than serving as a converter between two of the same layers for two different protocol (i.e., between the CXL LP 405 and the PCIe LP 425) as shown in FIG. 4. In that embodiment, the layer converter 135 can still include the DLL interface 410 which, from the perspective of the CXL LP 405 makes the layer converter 135 function like a CXL DLL. However, instead of the PCIe LP interface 415, the layer converter 135 can include a PCIe TL interface for interfacing directly with the PCIe TL 435. In that embodiment, the PCIe TL interface assumes the functions performed by the PCIe LP and the PCIe DLL so that these functional blocks can be removed from the design. Thus, from the perspective of the PCIe TL, the layer converter 135 functions like (or appears as) the PCIe DLL and LP layers 425, 430.

While the embodiments above describe a "legacy interconnect protocol" and a "new interconnect protocol," this was for ease of explanation and the embodiments herein can be generally applied to any two different interconnect protocols that share a common physical link. That is, assuming a chip designer has layers for one of the interconnect protocols that have already been tested and verified, the designer can leverage the embodiments discussed above to re-use those layers without modification. The designer then only has to design the layer converter 135 for interfacing these layers to the logical PHY of the common physical link.

Figure 5:
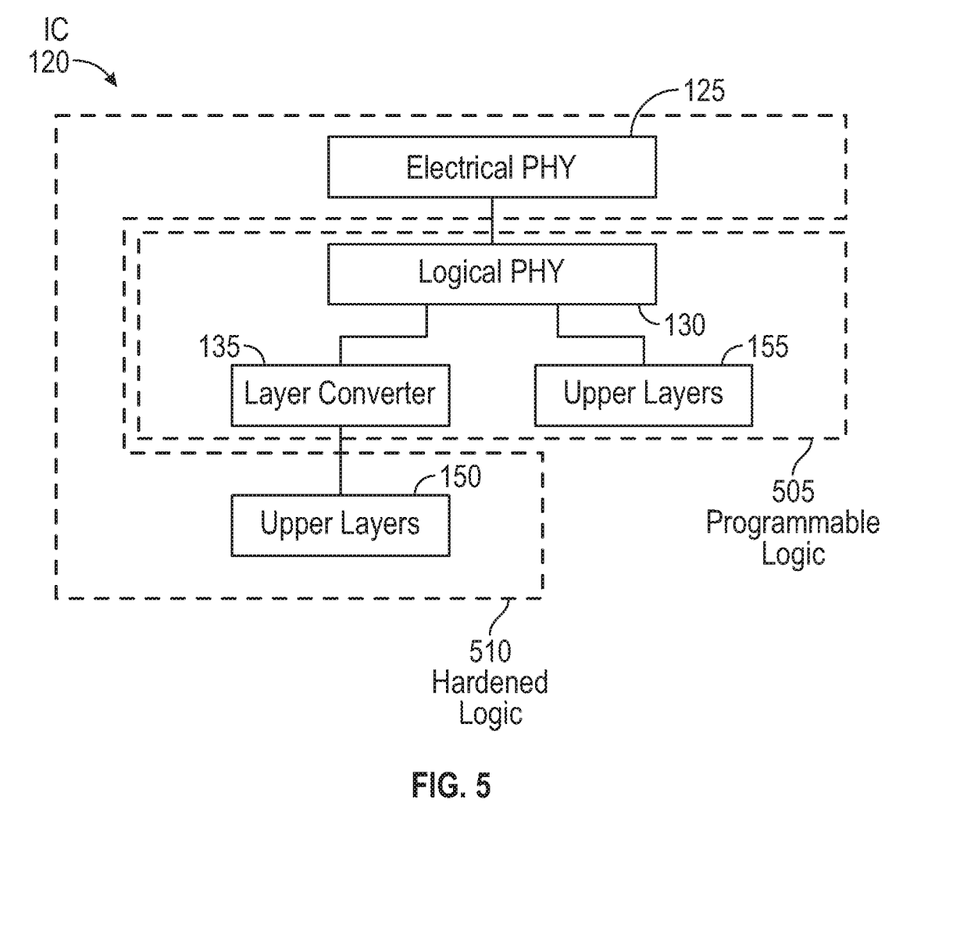
FIG. 5 illustrates using programmable and non-programmable logic to implement layers for two different interconnect protocols, according to an example.

FIG. 5 illustrates using programmable and non-programmable logic to implement layers for two different interconnect protocols, according to an example. In this embodiment, the layers defined by (i.e., compatible with) the legacy interconnect protocol are implemented in hardened logic 510 while the layers defined by the new interconnect protocol and the layer converter 135 are implemented in programmable logic. That is, the layers corresponding to the legacy interconnect protocol that have previously been tested and verified to function correctly can be disposed in hardened logic 510, thereby saving space on the IC 120 while the layers of the new interconnect protocol and the layer converter 135 can be implemented in the programmable logic 505 so these layers can be easily changed or updated as desired.

In another embodiment, only the layer converter 135 is implemented in programmable logic 505 while the layers of the legacy and new interconnect protocols are implemented in hardened logic 510—i.e., the electrical PHY 125, the logical PHY 130, the upper layers 150 defined by the legacy interconnect protocol, and the upper layers 155 defined by the new interconnect protocol.

In another embodiment, rather than using any programmable logic, all the components illustrated in FIG. 5 are implemented in hardened logic 510. Conversely, all the components illustrated in FIG. 5 can be implemented in programmable logic 505.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An apparatus, comprising:
   a port configured to couple the apparatus to an external computing system;
   a first upper layer coupled to the port and configured to separate data received from the external computing system into first data transmitted according to a first interconnect protocol and second data transmitted according to a second interconnect protocol;
   a layer converter comprising:
   a first interface configured to receive the first data from the first upper layer and up convert the first data according to the second interconnect protocol, and
   a second interface configured to receive the first data from the first interface and down convert the first data to be compatible with the first interconnect protocol; and
   a second upper layer coupled to the second interface, wherein the second upper layer is defined by the first interconnect protocol.

2. The apparatus of claim 1, further comprising:
   an electrical physical layer (PHY) coupled between the port and the first upper layer, wherein the electrical PHY is defined by the first interconnect protocol and the first upper layer is defined by the second interconnect protocol.

3. The apparatus of claim 2, wherein first upper layer is a logical PHY, and wherein the first interface is a Data Link Layer (DLL) interface defined by the second interconnect protocol.

4. The apparatus of claim 3, wherein the second upper layer is a logical PHY defined by the first interconnect protocol, wherein down converting the first data comprises converting the first data according to a standard interface associated with the first interconnect protocol.

5. The apparatus of claim 4, wherein the standard interface comprises the PHY Interface for the PCI Express (PIPE) standard interface.

6. The apparatus of claim 1, wherein the first and second interfaces permit the layer converter to span multiple layers of the first interconnect protocol when transmitting data between the first upper layer and the second upper layer.

7. The apparatus of claim 1, further comprising:
   a third upper layer coupled to the second upper layer; and
   a fourth upper layer coupled to the second upper layer, wherein the second upper layer is a logical PHY layer defined by the first interconnect protocol, the third upper layer is a DLL defined by the first interconnect protocol, and the fourth upper layer is a TL defined by the first interconnect protocol.

8. The apparatus of claim 7, further comprising:
   a fifth upper layer coupled to the first upper layer and configured to receive the second data from the first upper layer, wherein the layer converter, the second upper layer, the third upper layer, and the fourth upper layer form part of a first branch and the fifth upper layer forms part of a second branch, wherein the fifth upper layer is defined by the second interconnect protocol.

9. The apparatus of claim 1, wherein the first interconnect protocol comprises a PCIe protocol and the second interconnect protocol comprises at least one of: a newer version of the PCIe protocol than the first interconnect protocol or a cache coherency protocol.

10. An integrated circuit, comprising:
    an electrical physical layer (PHY) configured to transmit and receive data using a link with an external computing system;
    a first upper layer coupled to the electrical PHY and configured to separate data received from the external computing system into first data transmitted according to a first interconnect protocol and second data transmitted according to a second interconnect protocol;
    a layer converter comprising:
    a first interface configured to receive the first data from the first upper layer and up convert the first data, and
    a second interface configured to receive the first data from the first interface and down convert the first data; and
    a second upper layer coupled to the second interface, wherein the first and second upper layers are a same layer in a communication stack.

11. The integrated circuit of claim 10, wherein the first and second upper layers are both logical PHYs, wherein the first upper layer is defined by the second interconnect protocol and the second upper layer is defined by the first interconnect protocol.

12. The integrated circuit of claim 11, wherein the electrical PHY and the second upper layer are defined by the first interconnect protocol.

13. The integrated circuit of claim 10, wherein the first interface is configured to up convert the first data according to the second interconnect protocol and the second interface is configured to down convert the first data to be compatible with the first interconnect protocol.

14. The integrated circuit of claim 13, wherein up converting the first data comprises converting the first data according to a Data Link Layer (DLL) interface defined by the second interconnect protocol, and down converting the first data comprises converting the first data according to a standard interface associated with the second interconnect protocol.

15. The integrated circuit of claim 10, wherein the layer converter is implemented using programmable logic.

16. The integrated circuit of claim 15, wherein the electrical PHY and the second upper layer are implemented in hardened logic.

17. A method, comprising:
receiving data from an external computing system using an electrical PHY;
separating the received data into first data transmitted according to a first interconnect protocol and second data transmitted according to a second interconnect protocol;
up converting the first data according to the second interconnect protocol;
down converting the up converted data to be compatible with the first interconnect protocol; and
processing the down converted data at an upper layer compatible with the first interconnect protocol.

18. The method of claim 17, further comprising:
processing the second data using a plurality of upper layers compatible with the second interconnect protocol.

19. The method of claim 17, wherein up converting the first data comprises:
converting the first data according to a DLL interface defined by the second interconnect protocol.

20. The method of claim 19, wherein down converting the up converted data comprises:
converting the up converted data according to a standard electrical PHY interface associated with the first interconnect protocol.

* * * * *